(12) United States Patent
Ganesan et al.

(10) Patent No.: US 7,310,594 B1
(45) Date of Patent: Dec. 18, 2007

(54) METHOD AND SYSTEM FOR DESIGNING A MULTIPROCESSOR

(75) Inventors: Satish R. Ganesan, Mountain View, CA (US); Usha Prabhu, Los Gatos, CA (US); Sundararajarao Mohan, Sunnyvale, CA (US); Ralph D. Wittig, Menlo Park, CA (US); David W. Bennett, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 645 days.

(21) Appl. No.: 10/295,687

(22) Filed: Nov. 15, 2002

(51) Int. Cl.
*G06F 17/50* (2006.01)

(52) U.S. Cl. .................. 703/13; 716/1; 716/4; 716/18; 717/100; 717/104; 717/149

(58) Field of Classification Search ................ 717/104, 717/105, 159, 102, 106, 151, 140, 149; 716/1, 716/4, 18; 713/190; 703/13
See application file for complete search history.

(56) References Cited

U.S. PATENT DOCUMENTS

| | | | |
|---|---|---|---|
| 6,075,935 A * | 6/2000 | Ussery et al. ............... | 716/17 |
| 6,944,848 B2 * | 9/2005 | Hartman et al. ............ | 717/124 |
| 7,039,906 B1 * | 5/2006 | Trelewicz et al. .......... | 717/149 |
| 2001/0025363 A1 * | 9/2001 | Ussery et al. ............... | 716/1 |
| 2003/0023950 A1 * | 1/2003 | Ma et al. .................... | 717/102 |
| 2003/0037321 A1 * | 2/2003 | Bowen ........................ | 717/149 |
| 2003/0110481 A1 * | 6/2003 | Wada et al. ................. | 717/158 |
| 2005/0204348 A1 * | 9/2005 | Horning et al. ............. | 717/140 |

OTHER PUBLICATIONS

Dr. Guido Arnout teaches a SystemC Standard, includes a design implementation in both hardware and software (see pp. 573-577), (2000 IEEE).*

Matthew D'Souza teaches an "Embedded Bluetooth Stack implementation with Nios Softcore Processor", (Oct. 2001).*

David C. Zaretski teaches a "Design and Evaluation of MATLAB Functions on FPGAs", (Master Thesis, Jun. 2001).*

* cited by examiner

*Primary Examiner*—Paul Rodriguez
*Assistant Examiner*—Andre Pierre-Louis
(74) *Attorney, Agent, or Firm*—Pablo Meles; LeRoy D. Maunu

(57) ABSTRACT

A multiprocessor system (10) includes a plurality of processing engines (14, 16, 18, 20, 22, 32, 33 and 35) including a software processing engine and a hardware processing engine implemented on a single silicon device defined by a single programming language and the single programming language tagged with at least one macro. The multiprocessor system further includes connectivity (37 and 40) between the plurality of processing engines defined by the single programming language and by the single programming language tagged with at least one macro.

24 Claims, 7 Drawing Sheets

METHOD AND SYSTEM FOR DESIGNING A MULTIPROCESSOR

FIELD OF THE INVENTION

This invention relates generally to programmable logic devices, and more particularly to a method and system for designing a multiprocessor system using a single programming language.

BACKGROUND OF THE INVENTION

Programmable devices are general-purpose integrated circuits that can be configured for a wide variety of applications. Such programmable devices have two basic versions, mask programmable devices, which are programmed only by a manufacturer, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, complex programmable logic devices (CPLD), programmable gate arrays (PISA), application specific integrated circuits (ASIC).

As chip capacity continues to increase significantly, the use of field programmable gate arrays (FPGAs) is quickly replacing the use of application specific integrated circuits (ASICs). An ASIC is a specialized integrated circuit that is designed and mask programmed for a particular application such as a specialized microprocessor. With the shrinkage in integrated circuit design rules, FPGAS, which are user programmable, achieve almost the gate density of factory programmed ASICs. This high gate density has contributed immensely to the popularity of FPGAs. FPGAs typically include user configurable input/output blocks (IOBs), and programmable logic blocks, and configurable interconnect lines, and switching capability for interconnecting the lines and programming the blocks.

The advancement of computer chip technology has also resulted in the development of embedded processors and controllers. An embedded processor or controller can be a microprocessor or microcontroller circuit that has been integrated into an electronic device as opposed to being built as a standalone module or "plug in card." Advancement of FPGA technology has led to the development of FPGA-based systems-on-chip (SoC) including FPGA-based embedded processor SoCs. A SoC is a fully functional product having its electronic circuitry contained on a single chip. While a standalone microprocessor chip requires ancillary electronic components to process instructions, a SoC may include all required ancillary electronics on a single integrated circuit chip. For example, a SoC for a cellular telephone can include a microprocessor, encoder, decoder, digital signal processor (DSP), RAM and ROM. It should be understood when contemplating the present invention that an FPGA-Based SoC does not necessarily include a microprocessor or microcontroller. For example, a SoC for a cellular telephone could include an encoder, decoder, digital signal processor (DSP), RAM and ROM that rely on an external microprocessor. A SoC could also include multiple processing modules coupled to each other via a bus or several busses. It should also be understood herein that "FPGA-based embedded processor SoCs" are a specific subset of FPGA-based SoCs with or without their own processors.

The processing modules can either be hardware or software based.

Notwithstanding advantages provided by using FPGA-based SoCs, the development of these SoCs can be very challenging, particularly where software and hardware processing engines are combined in a single system. Existing systems for designing multiprocessors such as Coware SystemC cater to the needs of hardware designers with an emphasis on the detailed mechanics of a particular system. Such a system fails to allow a designer to work more in the software level of abstraction and fails to allow a user to use simple tags to implement different functions on different processing engines. In another system, the Celoxica Handel-C/Xilinx Forge compiler system allows C code to be translated directly into hardware using parallelizing compiler techniques. Rather than translating from C into hardware, there is a need to translate from function to structure where the structure can be hardware or software processors.

One of the other challenges includes communication among multiple hardware and software processors embedded in a FPGA-based SoC. Typically, such communication occurs over a bus. Unfortunately, communication over a bus involves a large amount of overhead due to bus arbitration times. Therefore, several clock cycles are typically needed for simple communication among processing modules. Furthermore, the actual links among the processing modules are not flexible in terms of defining or customizing data sizes and FIFO sizes. Also, many links among processors are processor type dependent. FPGA based embedded processor SoCs are being introduced into the market, but there are no solutions which allow users to customize the system, the hardware and software processing modules, the links among the processing modules, and the associated software, nor is there a system enabling a user to trade off a function between being implemented in hardware (FPGA fabric) or software (running on the embedded processor). It would be desirable to have a method and system for designing multiprocessor systems in FPGA-based SoCs that enables a translation (without resorting to a central processor or other co-processors) from function to structure including software and hardware processors independent of processing module type, and that further overcomes the shortcomings described above.

SUMMARY OF THE INVENTION

In a first aspect of the present invention, a method of designing a multiprocessor system using a single programming language comprises the steps of defining at least one of a structure of at least two processing engines and a connectivity between the at least two processing engines by tagging the programming language with a directive and compiling the programming language with the directive.

In a second aspect of the present invention, a multiprocessor system having a plurality of processing engines on a field programmable gate array based System-on-Chip (SoC) comprises a structure of at least two processing engines defined by a programming language and the programming language tagged with at least one directive and connectivity between the at least two processing engines defined by the programming language and by the programming language tagged with at least one directive.

In a third aspect of the present invention, a multiprocessor system comprises a plurality of processing engines including a software processing engine and a hardware processing engine implemented on a single silicon device defined by a single programming language and the single programming language tagged with at least one macro. The system further comprises connectivity between the plurality of processing engines defined by the single programming language and by the single programming language tagged with at least one directive.

The programming language and/or directive can further define functions to be performed by one or more of the plurality of processing engines and can define multiple instances of a function wherein structure representing the function is duplicated.

DETAILED DESCRIPTION OF THE DRAWINGS

Field programmable gate arrays (FPGA) have become very popular for telecommunication applications, Internet applications, switching applications, routing applications, and a variety of other end user applications. A field programmable gate array typically includes a programmable logic fabric (containing programmable logic gates and programmable interconnects) and programmable input/output blocks. The programmable input/output blocks are fabricated on a substrate supporting the FPGA and are coupled to the pins of the integrated circuit, allowing users to access the programmable logic fabric. The programmable logic fabric may be programmed to perform a wide variety of functions corresponding to particular end user applications and may be implemented in a variety of ways.

Figure 1:
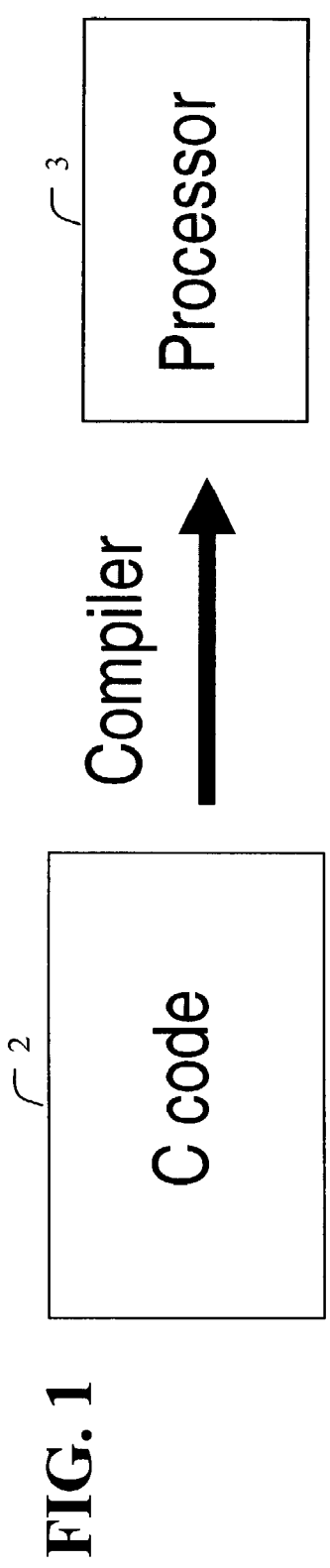
FIG. 1 illustrates traditional software development techniques where C code is compiled for use in a processor.
Figure 2:
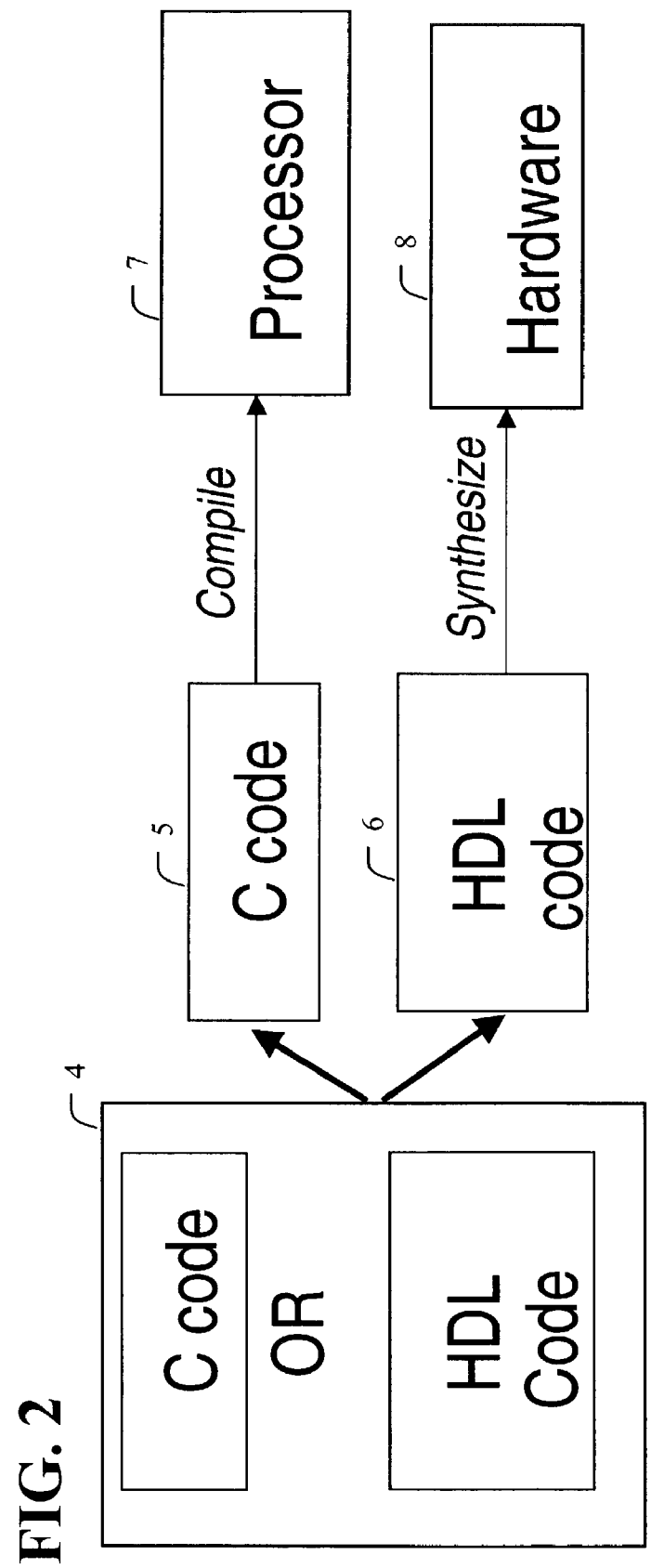
FIG. 2 illustrates traditional co-design development flow where hardware and software are specified separately using C code that is compiled and HDL code that is synthesized.

Traditional software development for processors typically required the compiling of software code (2) as shown in FIG. 1 before being used by a processor 3. Design of embedded systems using multiple hardware and/or software processors can be subject to many different types of constraints, including timing, size, weight, power consumption, reliability, and cost. Current methods for designing embedded systems require specification (4) and design of hardware (6) and software (5) separately where C code is compiled and HDL code is synthesized as shown in FIG. 2. A Hardware-software partition is usually decided a priori and is adhered to as much as is possible, because any changes in this partition may necessitate extensive redesign. Designers often strive to make everything fit in software, and off-load only some parts of the design to hardware to meet timing constraints. The problems with these design methods leads to difficulties in verifying the entire system, incompatibilities across HW/SW boundaries, and increased time to market.

Figure 3:
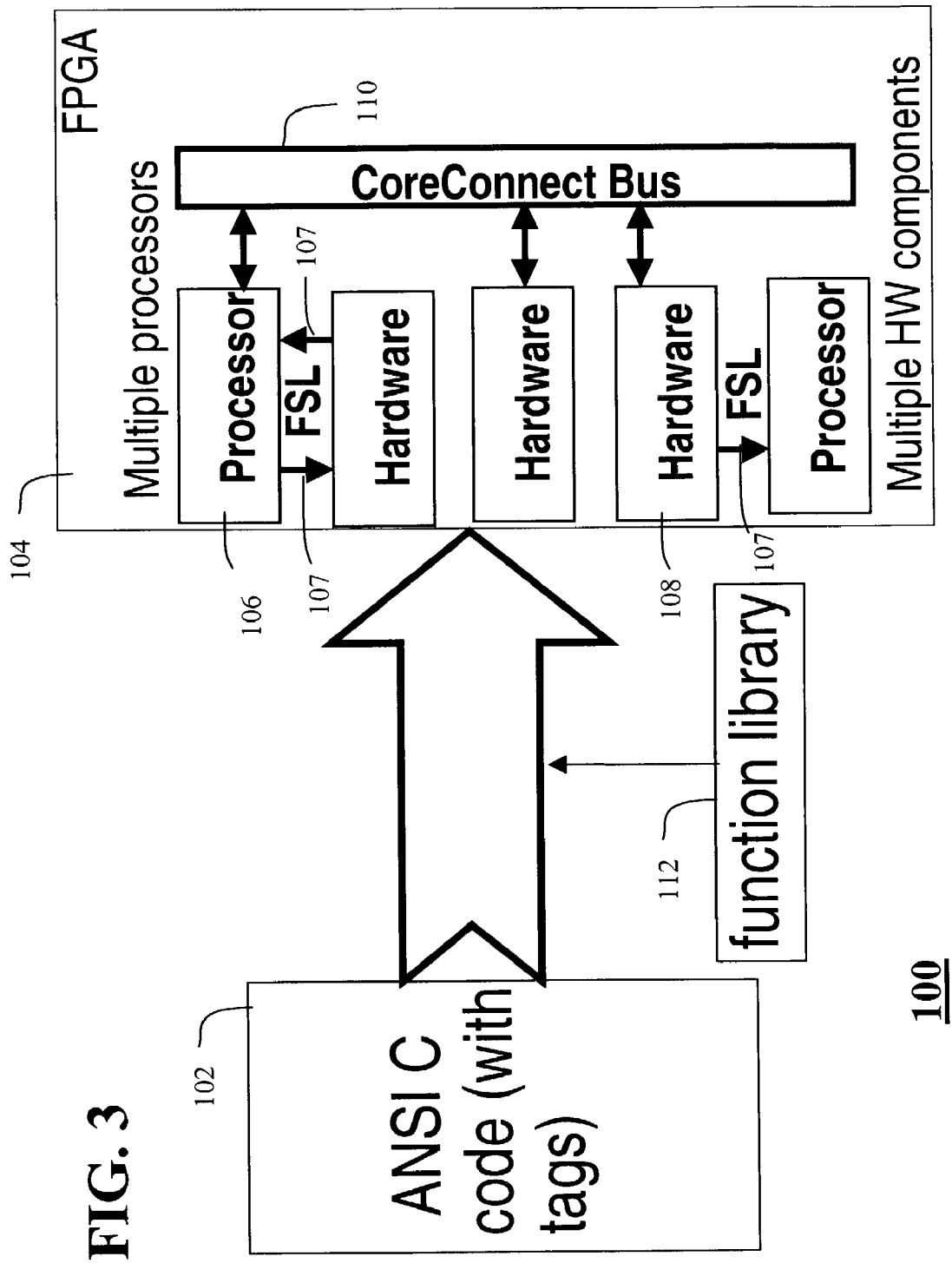
FIG. 3 depicts an exemplary block diagram of a multiprocessor system using C code with tags in accordance with the present invention.

Referring to FIG. 3, an exemplary block diagram of a multiprocessor system 100 using C code with tags in accordance with the present invention illustrates the various aspects of a co-design system. In each instance as will be shown in further detail in FIGS. 4-7, all the source code 102 can be written in a single programming language with tags. Preferably, the source code 102 is written in ANSI C, although the present invention is not limited thereto. In this manner, a designer does not need to learn a new language when modifying or specifying a design with software processors, hardware processors, and the connectivity between such processors. Referring to FIG. 3, the system 100 preferably utilizes a function library 112 that contains both hardware and software components called by the code with tags (102) when converted to a target implementation in the form of an FPGA 104. For example, the library can contain a design for "xil_idct1d" which contains the software and hardware implementations of a one dimension inverse discrete cosine transformation function on a 8×8 matrix. Likewise, "xil_matrix_transpose" can contain software and hardware implementations of a matrix transpose function for a 8×8 matrix. The co-design multiprocessor system 100 preferably comprises at least two processors such as a software processor 106 and a hardware processor 108 specified by C code with tags. The C code with tags may also specify the connectivity between the processors, for example using a fast simplex link (107) or a bus structure such as IBM's CoreConnect Bus 110.

A fast simplex link (FSL) or programmable uni-directional link among processing modules can be implemented using the reconfigurable programmability of the FPGA and the FPGA fabric by allowing different data sizes and FIFO sizes or buffer sizes while still enabling a single clock delay between processing modules for communication. FSL utilizes FIFOs for buffering and for synchronization between communicating processors. This programmability of the links allows greater flexibility during implementation and provides a fast point to point connection. The FSL can be used as the communication interface between any two processing modules independent of processing module types (hardware or software). FSL read and write instructions are currently available on Xilinx's MicroBlaze software processor. The processing module independence and the programmability greatly simplifies design paradigms like Co-design, or Multi-processing by standardizing the interface mechanism across hardware and software processors.

Figure 4:
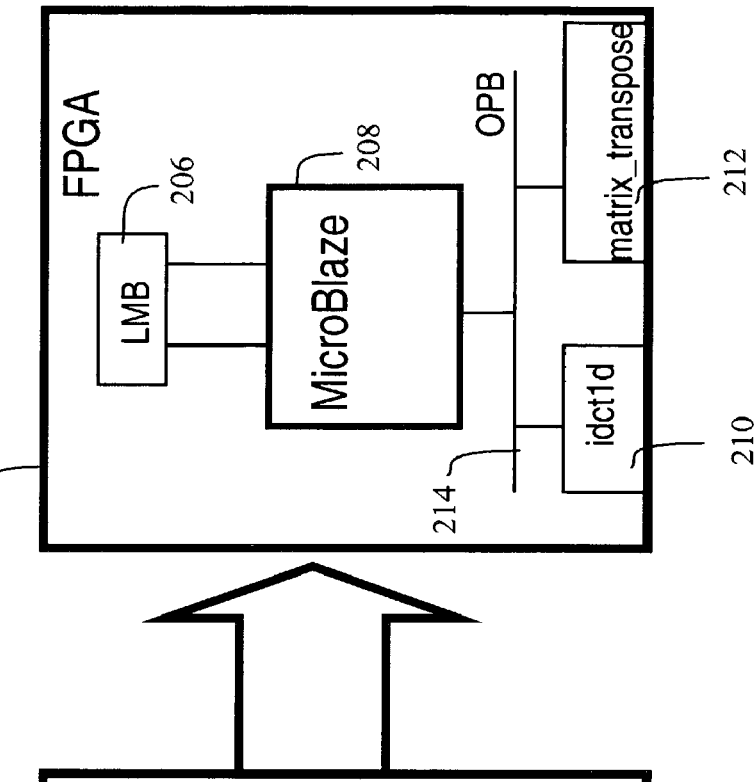
FIG. 4 is a more detailed block diagram of a multiprocessor system using C code with tags and a bus structure in accordance with the present invention.

Referring to FIG. 4, a multiprocessor system 200 illustrates how a system can be specified using a CoreConnect Bus 214 using C code with tags in source code 202 for connectivity between processors. The tags can be macros that compile with no side effects on any ANSI C compiler. An FPGA 204 is implemented in this instance with a single software processor 208, a local memory bus (LMB) 206 and several hardware processors 210 and 212. Hardware processor 210 can perform the function of idct1d and hardware processor 212 can perform the function of matrix_transponse. Calls to idct1d and matrix_transpose become calls to driver code that writes parameters to hardware and reads results from hardware. The CoreConnect bus 214 can be implemented using an On-Chip Peripheral Bus (OPB) as shown or a Processor Local Bus (PLB). As with the FSL, the CoreConnect bus can use FIFOs for buffering and synchronization as needed.

Figure 5:
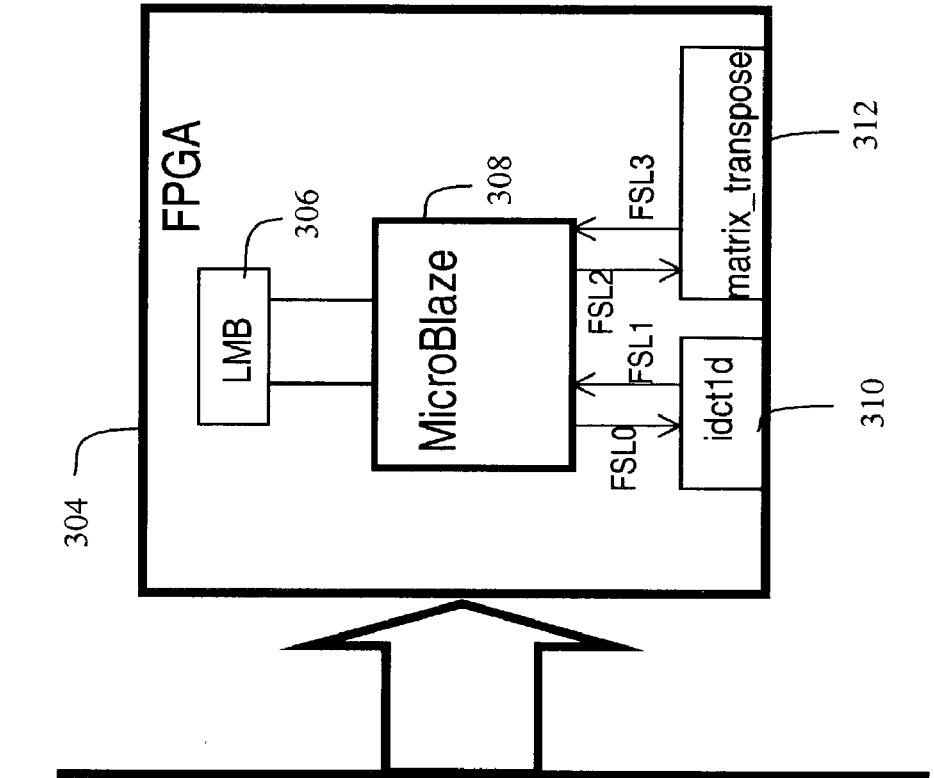
FIG. 5 is a more detailed block diagram of a multiprocessor system using C code with tags and uni-directional links in accordance with the present invention.

Similarly, shown in FIG. 5, is a multiprocessor system 300 using alternative FSL connectivity in an FPGA 304. Changing connectivity from OPB to FSL can be done by adding or modifying tags. The system 300 includes a software processor 308, a local memory bus (LMB) 306 and several hardware processors 310 and 312 using FSL connectivity as specified by source code 300, preferably using C code with tags as shown. More specifically, the idct1d processor 310 has its ports mapped to FSL0 for inputs and FSL1 for outputs. Likewise, the matrix_transpose processor 312 has its ports mapped to FSL2 for inputs and FSL3 for outputs. Note that hardware calls can be blocking or non-blocking. Blocking calls require the software processor to wait until results are available back from the hardware. Non-blocking calls on the other hand, allows the software processor to perform useful computation while the hardware processor is still computing its results.

Figure 6:
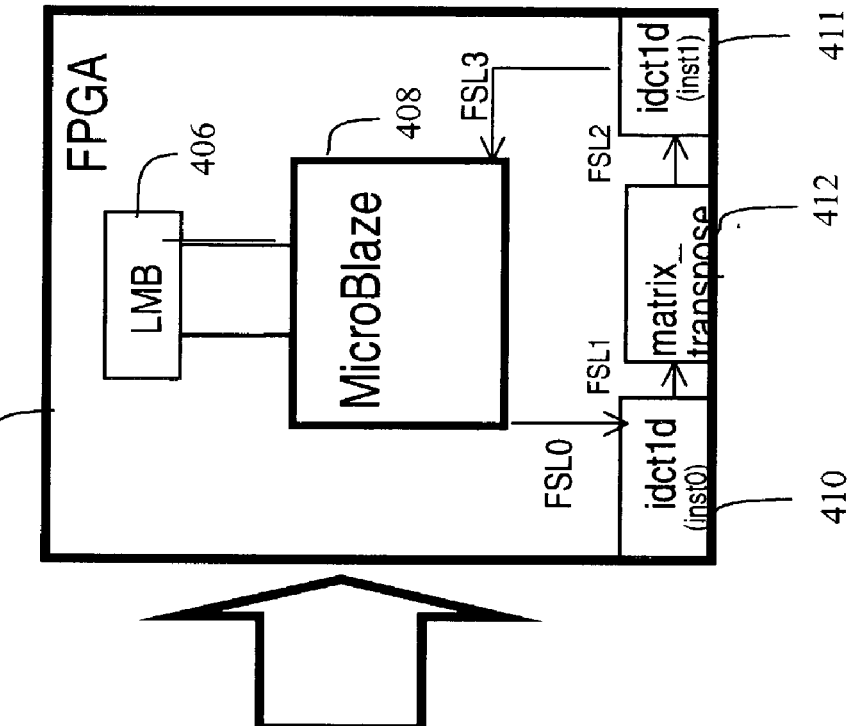
FIG. 6 is a more detailed block diagram of a multiprocessor system using C code with tags and the ability to define multiple hardware instances in accordance with the present invention.

Referring to FIG. 6, another multiprocessor system 400 is shown similar to the system 300 of FIG. 5 except that the source code preferably includes C code and tags that specify multiple structural instances of the same hardware function, namely hardware processor 410 and hardware processor 411 for idct1d (instance 0) and idct1d (instance 1) respectively. As in system 300, the system 400 includes source code 402, LMB 406, software processor 408, hardware processors 410, 411, and 412 as well as the FSL connectivity between processors as specified by the source code 402 as shown. A PORTMAP name mapping can be used to define pipelining between the processors in such configuration.

Figure 7:
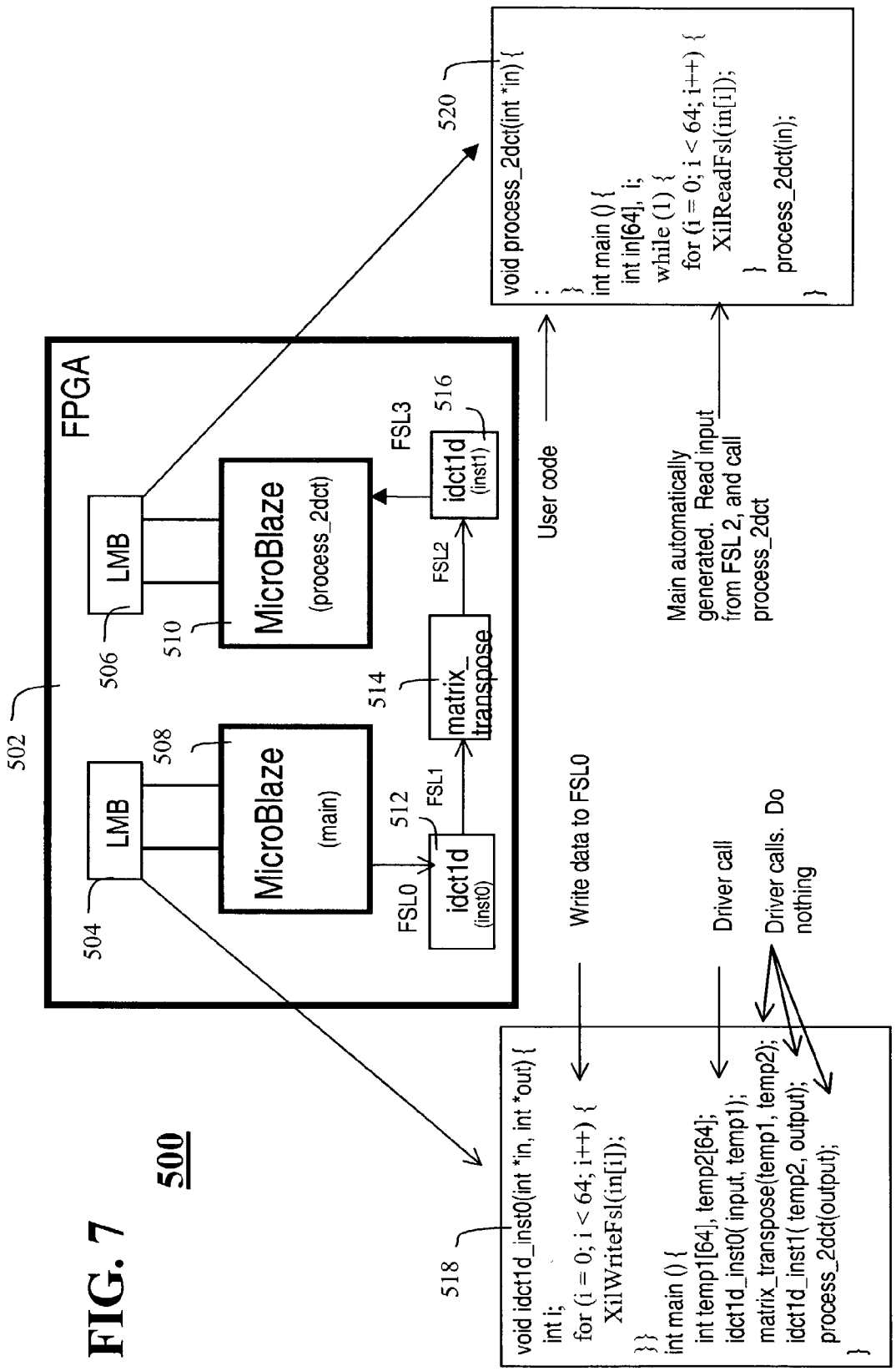
FIG. 7 illustrates the use of C code with tags to define multiple hardware and software processors

Referring to FIG. 7, yet another multiprocessor system 500 is shown illustrating the tremendous flexibility and variability of the present invention implemented in an FPGA 502. System 500 can include at least two software processors 508 and 510 as specified by source code preferably having C code with tags. The tags may also specify the connectivity between processors, other processors (hardware or software), as well as multiple structural instances. More specifically, system 500 illustrates this by including software processors 508 and 510, hardware processors 512 and 514 as well as the multiple instance of processor 512 by the presence of hardware processor 516 and the connectivity between all the processors in the form of FSL links. The system also includes LMB 504 and 506 that may contain the instruction and data (518 and 520) for the processors.

Figure 8:
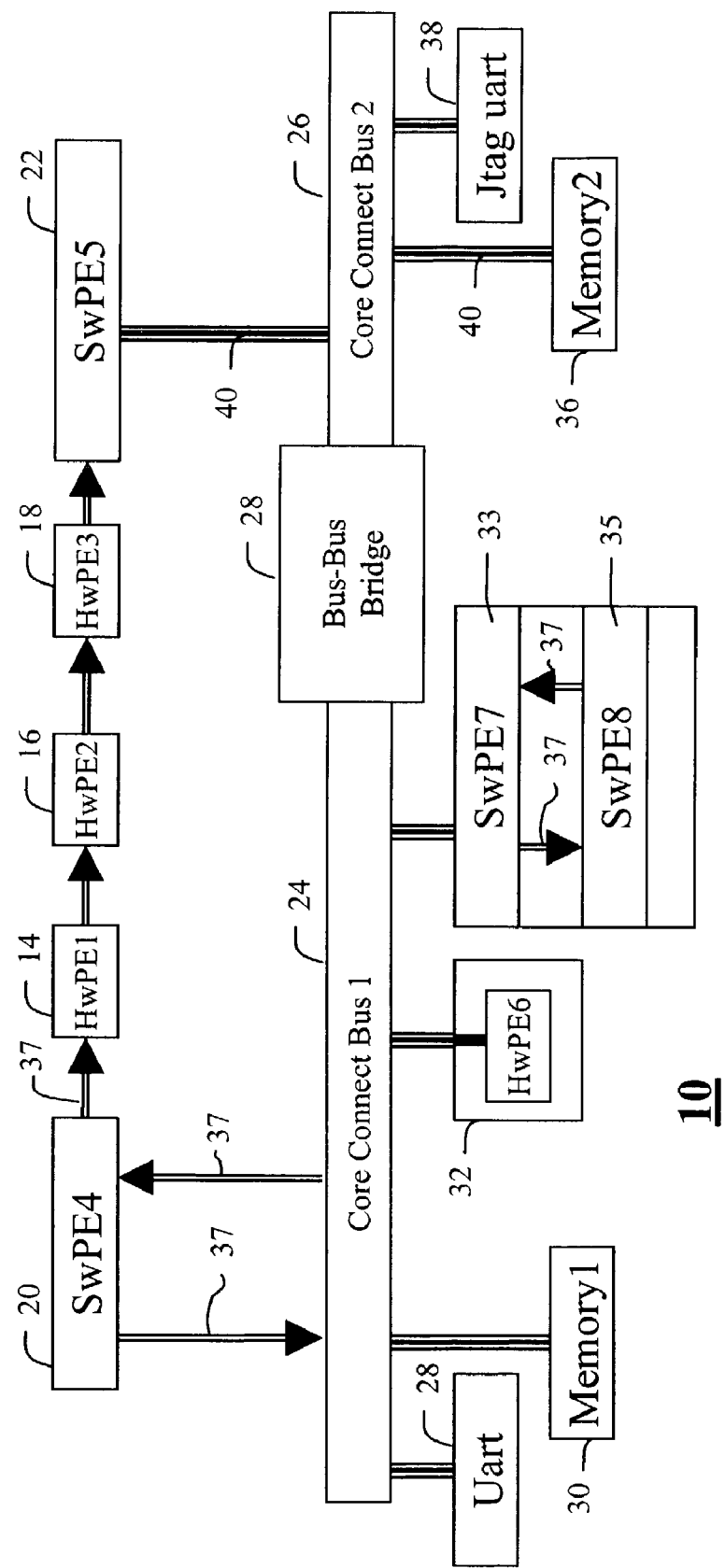
FIG. 8 depicts an exemplary block diagram of a multiprocessor system using configurable uni-directional links and buses in accordance with the present invention.

Another illustrative multiprocessor system 10 shown in FIG. 8 preferably comprises a plurality of processing modules or engines including software processing engines 20, 22, 33, and 35 as well as hardware processing engines 14, 16, 18, and 32 implemented on a field programmable gate array. The multiprocessor system 10 can further comprise a plurality of configurable uni-directional links 37 such as fast simplex links (FSL) coupled among at least two of the plurality processing modules providing a streaming communication channel between at least two of the plurality of processing modules. The plurality of uni-directional links can be formed from a first-in-first-out (FIFO) streaming communication network and can also be ideally formed using the reconfigurable fabric of the field programmable field array to enable uni-directional links that are configurable in terms of depth in buffer (FIFO) size and width in bit size. For example processing engines 20, 14, 16, 18 and 22 are connected in a chain using these uni-directional links. Likewise, software processing engines 33 and 35 can each be wrapped in an interface connected by another chain of uni-directional links 37. The multiprocessor system 10 can also comprise one or more buses 24 and 26 such as IBM's CoreConnect bus linking the plurality of processing engines as well as other components such as UART 28, memory 30, memory 36, and JTAG UART 38. Multiple buses (24 and 26) can be connected via Bus-to-Bus bridges such as bridge 28. Connections 40 between the buses and the processing engines or buses and other components can utilize an interface to the CoreConnect bus using an FSL 37 or a link 40 such as the IPIF (IP interface) or other similar interface as shown in FIG. 8. The IPIF currently supports communication either with the OPB bus or the PLB bus of the CoreConnect bus.

FIG. 8 also represents the structural view of a dedicated distributed multiprocessor system. As explained above, the system consists of a set of one or more processing engines (PE) communicating through buses and interfaces such as the CoreConnect Bus or using the FSL links. The processing engines (PE) shown can be a Software-driven Processing Engine (SwPE) which can consist of a central microprocessor that performs a computation. This microprocessor may off-load some if it's functions to other processing engines. For example, this microprocessor can be an IBM PowerPC or a Xilinx MicroBlaze SoftProcessor although the present invention is not limited thereto. The PE can also be a Hardware Processing Engine (HwPE). In this case, the entire computation is performed in hardware. Each hardware PE should preferably comprise of a C code that can be implemented in software and an HDL implementation of the hardware. Every PE preferably contains one or more interfaces to either a FSL or a bus of the CoreConnect bus on both the input and output side.

Communication between any two processing engines is achieved in one of the following ways:

Direct Data Flow: The processing engines in this case are connected by the FSL bus. In FIG. 8, this is represented by the connection 37 between SwPE7 (33) and SwPE8 (35) or the connection between the HwPE1 (14) and HwPE2 (16).

Single Bus with Shared Memory: In this configuration, the processing engines (20 and 33) are connected as masters to the CoreConnect bus. All accesses to shared data are arbitrated by the bus. Control signals, if any, required to determine the order of such shared memory data accesses, are also communicated via the shared memory. In FIG. 8, this is represented by the elements SwPE4 (20), SwPE7 (33) and Memory1 (30) connected by CoreConnect bus 1 (24).

Multiple Buses with Shared Memory: In this configuration, each processing engine has it's own bus and memory. The two buses 24 and 26 are connected via a bus-to-bus bridge 28. Data is transferred from one processor to the other using this bridge. This is represented by the elements SwPE7 (33), SwPE5 (22) and Memory2 (36). SwPE7 (33) is connected to Memory 2 (36) using the bus-to-bus bridge 28 between CoreConnect Buses 24 and 26.

The multiprocessor system 10 as shown in FIG. 8 preferably has a plurality of processing engines on a field programmable gate array based System-on-Chip including a structure of at least two processing engines and connectivity between the two or more processing engines defined by a programming language such as the C programming language or code and the programming language tagged with at least one directive or macro such as C preprocessor directive. The programming language and the programming language tagged with at least one directive can specify the multiprocessing system as a single monolithic C program. The processing engines can be either a software processing engine or a hardware processing engine and the programming language and the programming language tagged with at least one directive are compiled using a single processor. The software processing engine and the hardware processing engine and the connectivity therebetween can be implemented on a single silicon device such an FPGA and as defined by a single programming language using tags or macros. The connectivity can be implemented in the form of configurable uni-directional links connected between at least a portion of the plurality of processing engines. The system can also have connectivity in the form of at least one bus connecting one processing engine to another processing engine. Some or all of the processing engines can also have an interface comprising a plurality of configurable uni-directional serial links coupled to a plurality of input ports of a processing module, wherein a first portion of the plurality of configurable uni-direction serial links are from at least another processing module and a second portion of the configurable plurality of uni-directional serial links are from a bus connection and a plurality of configurable uni-directional serial links coupled to a plurality of output ports of the processing module, wherein a first portion of the plurality of configurable uni-direction serial links are coupling to at least another processing module and a second portion of the plurality of configurable uni-directional serial links are coupling to a bus connection.

One of the advantages of a system built in accordance with the present invention is the ability of a bus master (PPC or MicroBlaze, for example) to perform useful computation in parallel while multiple processing modules communicating through FSL channels or the CoreConnect bus are active. Additionally, by providing the flexibility to use CoreConnect as a communication channel, the present invention offers all the advantages of a system built purely with a CoreConnect bus. Also, the availability of the CoreConnect bus allows easy integration of sub-systems built using just the CoreConnect bus, along with sub-systems built using the present invention. This model simplifies co-design by enabling implementation of modules in software or hardware by a simple change in tags. The FSL channel implements a dedicated data flow channel, thereby providing a "single clock delay" communication between any two data-dependent processing modules. Without the FSL communication channel, the data has to be communicated using the CoreConnect bus or other bus that consumes several clock cycles.

The code necessary for implementing the design of the FPGA-based SoC can be in a format such as the well known hardware description language (HDL). HDL is a language used to describe the functions of an electronic circuit for documentation, simulation and/or logic synthesis. Verilog and VHSIC Hardware Description Language (VHDL) are standardized HDLs which are well known by those skilled in the art. Verilog and VHDL can be used to design electronic systems at the component, board and system level. They can facilitate the development of models at a very high level of abstraction. Other formats now known or to be discovered can also be used to represent the system model.

The Processing Tag Format (PTF) is preferably used to define Processing Engines (PE), Processing Engine Instances (PEInst) and connectivity between the Processing Engines of a multiprocessor system described in C. The PTF may be specified in a separate PTF file or as an integral part of the user's C code that describes the system. When specified within the user's C code, the tags are treated as regular C pre-processor directives by a C compiler. These tags are used by a Processing System Builder to generate multiprocessor systems. Some constructs of the PTF can only be used when specified within the user's C code. It should clearly be understood that the present invention is not limited to the PTF format and files described herein and that other formats and files providing the equivalent function can be used.

As an exemplary illustration of tagging in accordance with the present invention, PTF will be described in further detail. The following description is illustrative only and should not be taken as limiting the invention to this described embodiment. The PTF file (or PTF directives in the user's C code) can define the following:

List of Processing Engines in the system

List of Processing Engine Instances in the system

Connectivity between the specified Processing Engine Instances.

The PTF syntax is preferably case sensitive. Although the PTF syntax for defining PEs, PE Instances, PE Instance calls, PE Instance Type, PE Instance Port Maps, etc. are specifically described in one embodiment, the present invention is not limited thereto. When specified within the user's C code, the PTF constructs can be treated as regular C pre-processor directives. Comments in the PTF file may be specified as in C. Both the (//) style comments and the (/* . . . */) style comments are preferably supported. In defining PEs, the syntax for defining PEs in the PTF is preferably:

XIL_PE void pename (paramtag param1[n], paramtag param2[m], . . . );

The XIL_PE keyword can specify the beginning of a new PE definition. pename can specify the name of the function for which the PE is being defined. The paramtag preferably specifies or indicates whether the associated parameter is an input parameter or an output parameter such as the paramtag XIL_INPUT or XIL_OUTPUT. Every parameter should be preceded by a paramtag. Further, every parameter is preferably a single dimensional array of integers. When the array size is greater than one, the size of the array should be specified as param1[n] where n is the array size.

For example, the following tag may be specified to indicate the function idct is PE with 2 parameters. The first parameter is an input of size 8 and the second parameter is an output of size 8.

XIL_PE idct (XIL_INPUT in[8], XIL_OUTPUT out[8]);

The XIL_PE tag should be associated with a function declaration or a function definition. The above code when pre-processed using a regular C compiler will be translated as follows:

void idct (int in[64], int out[64]);

Note, any function defined as a PE using the XIL_PE tag should not be defined more than once (the function should not be defined as static in C) anywhere in the user's code. The tag may be specified in any one file. Further, the function should not return any value. Also, all input and output parameters passed should be arrays of integers (the array may be of size one in which case the parameter is just an integer). The sizes of the parameter specified in the tag can be used by the Processing System Builder to generate interfaces to the PE. Hence, these parameter sizes and direction should exactly depict the behavior of the PE.

The syntax for defining PE Instances in the PTF for example can be:

XIL_PEINST (pename, petype_tag, peportmap_tag) OR

XIL_PEINST (pename, instname, petype_tag, peportmap_tag)

The XIL_PEINST keyword can specify the beginning of a new PE instance definition. pename can specify the name of the function for which the PE is being defined. instname can be a user provided name that specifies the name of the instance to which the current tag applies. The same function can have more than one instance specified using different instname. When there is only one instance in the design, no instname needs to be specified in this embodiment. The XIL_PEINST tag or its equivalent can provide a way of controlling the implementation of a function. The implementation target can be specified using the petype_tag and the port connectivity can be specified using the peportmap_tag. The same function may be tagged with different petype_tags and peportmap_tag by using different instname identifiers.

In specifying the PE Instance Type, the petype_tag can specify the implementation target of the instance being tagged. Although by no means limited to the list provided below, the petype_tag can be one of the following:

XIL_HWPE—specifies that the instance is a hardware processing engine.

XIL_MB32—specifies that the instance is a MicroBlaze32 soft microprocessor.

XIL_PPC405—specifies that the instance is a PowerPC 405 microprocessor.

XIL_PAR—specifies that all calls within the function main ( ) are parallel calls.

In specifying the PE Instance Port Maps, the peportmap_tag can specify the connectivity of all parameters of the instance being defined. The syntax for specifying the port maps for example can be:

XIL_PORTMAP ([XIL_FSLIN|XIL_FSLOUT|XIL_OPBIN|XIL_OPBOUT |XIL_PLBIN|XIL_PLBOUT (conn_name)]+)

conn_name can be the name of the connection interface.

XIL_FSLIN can specify that all parameters of the function which are inputs use FSL conn_name as the connection interface.

XIL_FSLOUT can specify that all parameters of the function which are outputs use FSL conn_name as the connection interface.

XIL_OPBIN can indicate that all parameters of the function which are inputs use OPB conn_name as the connection interface.

XIL_OPBOUT can indicate that all parameters of the function which are outputs use OPB conn_name as the connection interface.

XIL_PLBIN can indicate that all parameters of the function which are inputs use PLB conn_name as the connection interface.

XIL_PLBOUT can indicate that all parameters of the function which are outputs use PLB conn_name as the connection interface.

Connectivity between two different instances tagged using the XIL_PEINST tag can be achieved by matching the connector names and types specified in the tag.

Below is an example of a PE Instance tag for the idct PE:

XIL_PEINST(idct,XIL_HWPE,XIL_PORTMAP(XIL_FSLIN(f1), XIL_FSLOUT(f2)))

In this particular embodiment, the above tag specifies that inst0 of PE idct is a hardware processing engine. All inputs use the FSL, f1, and all outputs use the FSL, f2. A direct connection between the function idct and another function myfunc for e.g. may be specified by specifying the same connector names on the output of idct and the input of myfunc as given below.

XIL_PEINST(idct,XIL_HWPE,XIL_PORTMAP(XIL_FSLIN(f1), XIL_FSLOUT(f2)))

XIL_PEINST(myfunc,XIL_MB32,XIL_PORTMAP(XIL_FSLIN(f2),XIL_FSLO UT(f3)))

Multiple instances of idct may be specified in the code as:

XIL_PEINST(idct,inst0,XIL_HWPE,XIL_PORTMAP (XIL_FSLIN(f1), XIL_FSLOUT(f2)))

XIL_PEINST(idct,inst1,XIL_HWPE,XIL_PORTMAP (XIL_OPBIN(o1), XIL_OPBOUT(o2)))

Note, the PE instance tag is preferably specified outside the scope of any function in the C code. When a PE is defined using the XIL_PE tag, and no corresponding PE instance tag is defined, all calls to the PE are preferably implemented on the local processor. The XIL_PEINST tag may also be specified for the main ( ) function. This will mean that the top-level processor of the design will be instantiated with the bus interfaces as specified in the tag. The connectivity between the PE instances is based on the name of the connector although the present is certainly not limited to such convention. The user should ensure that the data flow in his code is consistent with the behavior specified by the tags. The petype_tag XIL_PAR can be used with reference to the main ( ) function. This indicates that all calls within main are parallel calls to other PE instances.

In specifying a Processing Engine Instance Call, the syntax or the default mechanism for invoking a function call is preferably using the normal C function calling mechanism when only one instance for a PE is specified. However, when more than one XIL_PEINST tag is declared for the same function (using different instname identifiers), the syntax for invoking a particular instance of a PE can be for example:

XIL_CALL (pename, instname, function_args)

pename can specify the name of the function to which the call is made. instname can specify the name of the instance of the function that is being called corresponding to the XIL_PEINST tag. The calls to PE instances are resolved based on the petype_tag associated with the instance. Note, this tag in the present embodiment can be used only within the user's C code. This tag should not be used when the PTF is specified in a separate file. When specifying more than one function, instname should be specified to call the instance using XIL_CALL.

When tagging a C code, it is possible that two different functions tagged with XIL_PEINST tag as a microprocessor, call the same third function also tagged as a XIL_PEINST. For example, the instance tags are specified as:

XIL_PEINST(A,XIL_MB32PE,XIL_PORTMAP(XIL_FSLIN(f1), XIL_FSLOUT(f2)))

XIL_PEINST(B,XIL_HWPE,XIL_PORTMAP(XIL_FSLIN(f5), XIL_FSLOUT(f6)))

XIL_PEINST(C,XIL_HWPE,XIL_PORTMAP(XIL_FSLIN(f11), XIL_FSLOUT(f12)))

and the C code is as follows:

```
void A (int a[32], int b[32]) {
...
C (x, y);
...
}
void B (int p[64], int q[64]) {
...
C (u, v);
...
}
```

In this case, the structure corresponding to the function C, and the structure for all subsequent function calls from within the function C is duplicated for both A and B.

In order to code a system in C using the PTF, a user will preferably need to include the file "xiltags.h" in their program. Xilinx also provides predefined Processing libraries that implement certain algorithms. In order to use these functions in a program, the file "xilProcessinglib.h" will need to be included. Of course, other embodiments may similarly require other predefined processing libraries and files.

Below is a list of guidelines for using PTF tags in C code in the present embodiment:

Ideally include the "xilProcessinglib.h" file to use the functions from the Processing Library. The XIL_PE tags for these functions are already present in the file.

Specify all the XIL_PE and XIL_PEINST tags of your system in a separate header file.

Ensure that the array sizes you specify for the XIL_PE tag exactly depict the sizes of the array used by the function.

Ensure that the connectivity specified by the names of the connector used in the XIL_PEINST tag honor the dataflow in the C code.

When specifying more than one XIL_PEINST, specify an instance name (which does not use the x_inst_prefix) for each tag so that they can be used in the XIL_CALL tag when invoking the function.

Use XIL_CALL to call a PE that has more than one PE instance associated with it.

Ensure that the duplication of PE instances based on the function call graph structure is what is intended.

The following is an example of PTF specified within the user's C code.

```
#include "xilProcessinglib.h" // Include Xilinx Processing
library
// Defines PE : idct
XIL_PE void idct (XIL_INPUT in[8], XIL_OUTPUT out[8]);
// Defines PE : matrix_transpose
XIL_PE void matrix_transpose (XIL_INPUT in[64], XIL_OUTPUT
out[64]);
extern int input[64];
int output[64];
int temp[64];
void idct8x8(int *in, int *out) {
int i;
int *inptr, *outptr;
inptr = in;
outptr = out;
for (i = 0; i < 8; i++) {
    idct(inptr, outptr);
    inptr += 8;
    outptr += 8;
}
}
int main ( ) {
int temp1[64], temp2[64];
int i, j;
idct8x8 (input, temp1);
matrix_transpose(temp1, temp2);
idct8x8 (temp2, output);
for (i = 0; i < 64; i++) {
putnum (output[i]);
print ("\n")
}
}
```

The following list of C preprocessor directives are reserved to perform Processing specific operations.

XIL_PE

XIL_INPUT

XIL_OUTPUT

XIL_HWPE

XIL_MB32

XIL_PPC405

XIL_IN

XIL_OUT

XIL_PEINST

XIL_PORTMAP

XIL_FSLIN

XIL_FSLOUT

XIL_OPBIN

XIL_OPBOUT

XIL_PLBIN

XIL_PLBOUT

XIL_CALL

All XIL_PEINST instname beginning with the keyword x_inst_is reserved.

In light of the foregoing description of the invention, it should be recognized that the present invention can be realized in hardware, software, or a combination of hardware and software. A method and system for multiprocessors according to the present invention can be realized in a centralized fashion in one computer system, or in a distributed fashion where different elements are spread across several interconnected processing modules. A typical combination of hardware and software could be a general purpose computer system with a computer program that, when being loaded and executed, controls the computer system such that it carries out the invention described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims. In this spirit, note that the PTF tags, directives and other coding described above are merely provided as examples and should not be construed to limit the scope of the invention since such constructs can be expressed in many different ways.

The invention claimed is:

1. A method of designing a multiprocessor system using a single programming language, comprising the steps of:
    defining in at least one file with program code in the single programming language, a structure of at least two processing engines and a connectivity between the at least two processing engines by tagging the code with preprocessor compiler directives;
    wherein a first preprocessor compiler directive in the code specifies for a first processing engine of the at least two processing engines, a type of embedded processor on which compiled code from the at least one file is to execute, and a second preprocessor compiler directive in the code specifies for a second processing engine of the at least two processing engines, a first function from a library containing a plurality of implementations of a plurality of functions, and the second preprocessor compiler directive specifying one of a software implementation and a hardware implementation of the first function;
    wherein the library includes for the first function, the software implementation in a high-level programming language for compilation into processor executable program code and the hardware implementation in a hardware description language that specifies a circuit;
    compiling the code in the at least one file with the preprocessor compiler directives;
    wherein compiling includes generating processor executable instructions for execution by a processor;
    obtaining from the library each hardware implementation of each function specified by a preprocessor compiler directive in the code; and
    generating from each hardware implementation, including the hardware implementation of the first function, a circuit definition.

2. The method of claim 1, wherein the step of defining comprises the step of defining at least one of the structure and the connectivity using C code and C preprocessor directives.

3. The method of claim 1, wherein the step of compiling the program with the directives comprises the step of compiling the programming language with the directives on a single processor.

4. The method of claim 1, wherein the method further comprises the step of verifying a functional specification of the multiprocessor system using a single processor.

5. The method of claim 1, wherein the method further comprises the step of simulating the multiprocessor system functionality using a single processor.

6. The method of claim 1, wherein the method further comprises the step of controlling compile time switches in order to define a function as part of a new or existing processing engine.

7. The method of claim 1, wherein the step of defining further comprises the step of specifying the multiprocessing system as a single monolithic C program.

8. The method of claim 1, wherein the at least one preprocessor compiler directive that specifies at least one function defines multiple instances of the function wherein structure representing the function is duplicated.

9. The method of claim 1, wherein at least one preprocessor compiler directive in the code defines at least one connectivity characteristic between the embedded processor and the hardware implementation of the at least one function, the at least one connectivity characteristic selected among the group comprising a size of the ports for interface generation, the directions of the ports, an interface type, a bus with shared memory.

10. A multiprocessor system having a plurality of processing engines on a field programmable gate array based System-on-Chip, comprising:
    a structure of at least two processing engines defined by at least one file with program code in a single programming language and the programming language tagged with preprocessor compiler directives;
    wherein a first preprocessor compiler directive in the code specifies for a first processing engine of the processing engines, a type of embedded processor on which compiled code from the at least one file is to execute, and a second preprocessor compiler directive in the code specifies for a second processing engine of the processing engines, a first function from a library containing a plurality of implementations of a plurality of functions, and the second preprocessor compiler directive specifying one of a software and a hardware implementation of the first function;
    wherein the library includes for the first function, the software implementation in a high-level programming language for compilation into processor executable program code and the hardware implementation in a hardware description language that specifies a circuit;
    connectivity between the at least two processing engines defined in the program code by at least one preprocessor compiler directive; and
    wherein the second processing engine is generated from the hardware implementation in the hardware description language from the library.

11. The multiprocessor system of claim 10, wherein the structure and the connectivity are defined using C code and C preprocessor directives.

12. The multiprocessor system of claim 10, wherein the programming language and the programming language tagged with at least one directive are compiled using a single processor.

13. The multiprocessor system of claim 10, wherein the programming language and the programming language tagged with at least one directive specify the multiprocessing system as a single monolithic C program.

14. The multiprocessor system of claim 10, wherein at least one preprocessor compiler directive in the code defines at least one connectivity characteristic between the embedded processor and the hardware implementation of the at least one function, the at least one connectivity characteristic selected among the group comprising: a size of the ports for interface generation, the directions of the ports, an interface type, and a bus with shared memory.

15. A multiprocessor system, comprising:
    a plurality of processing engines including a software processing engine and a hardware processing engine implemented on a single silicon device defined by at least one file with program code in a single programming language, the program code being tagged with at least one macro;

wherein a first macro in the code specifies for the software processing engine, a type of processor on which compiled code from the at least one file is to execute, and a second macro in the code specifies for the hardware processing engine, a first function from a library containing a plurality of implementations of a plurality of functions, and the macro specifying one of a software implementation and a hardware implementation of the first function;

wherein the library includes for the first function, the software implementation in a high-level programming language for compilation into processor executable program code and the hardware implementation in a hardware description language that specifies a circuit;

connectivity between the plurality of processing engines defined by at least one macro in the code; and wherein the hardware processing engine is generated from the hardware implementation in the hardware description language from the library.

16. The multiprocessor system of claim 15, wherein the single programming language is C code and the at least one macro is at least one C preprocessor directive.

17. The multiprocessor system of claim 15, wherein the silicon device is a field programmable gate array.

18. The multiprocessor system of claim 15, wherein the code in the single programming language and the at least one directive are compiled using a single processor.

19. The multiprocessor system of claim 15, wherein the multiprocessor system further comprises a plurality of configurable uni-directional links connected between at least a portion of the plurality of processing engines.

20. The multiprocessor system of claim 15, wherein the multiprocessor system further comprises at least one bus connecting one processing engine to another processing engine.

21. The multiprocessor system of claim 15, wherein the multiprocessor system further comprises an interface for at least a portion of the plurality of processing engines, the interface comprising a plurality of configurable uni-directional serial links coupled to a plurality of input ports of a processing module, wherein a first portion of the plurality of configurable uni-direction serial links are from at least another processing module and a second portion of the configurable plurality of uni-directional serial links are from a bus connection and a plurality of configurable uni-directional serial links coupled to a plurality of output ports of the processing module, wherein a first portion of the plurality of configurable uni-direction serial links are coupling to at least another processing module and a second portion of the plurality of configurable uni-directional serial links are coupling to a bus connection.

22. The multiprocessor system of claim 15, wherein the at least one macro that defines at least one function defines multiple instances of the function wherein structure representing the function is duplicated.

23. The multiprocessor system of claim 15, wherein the at least one macro that defines connectivity specifies at least one connectivity characteristic selected among the group comprising of: a size of the ports for interface generation, the directions of the ports, an interface type, a bus with shared memory.

24. A method for processing an electronic circuit design, comprising:

storing program code of single programming language in at least one file, the program code including code that is compilable into instructions that are executable by an embedded processor on a field programmable gate array (FPGA), a first preprocessor compiler directive that specifies a first function from a library containing a plurality of implementations of a plurality of functions for the FPGA, and a second preprocessor compiler directive that specifies connection characteristics between the embedded processor and the hardware implementation of the first function, and the first preprocessor compiler directive specifying one of a software implementation and a hardware implementation of the first function;

wherein the library includes for the first function, the software implementation in a high-level programming language for compilation into processor executable program code and the hardware implementation in a hardware description language that specifies a circuit;

compiling the program code in the at least one file into instructions for execution by the embedded processor;

obtaining from the library, in response to the at least one preprocessor compiler directive that specifies the first function, the hardware implementation of the first function for programming the FPGA; and generating, in response to the second preprocessor compiler directive that specifies the connection characteristics, data that configures resources of the FPGA to couple the embedded processor to the hardware implementation of the first function.

* * * * *